Jan. 7, 1936.        A. P. WOOD        2,027,136
DYNAMO ELECTRIC MACHINE
Filed April 12, 1935

Inventor:
Alexander P. Wood,
by Harry E. Dunham
His Attorney.

Patented Jan. 7, 1936

2,027,136

UNITED STATES PATENT OFFICE 2,027,136

DYNAMO-ELECTRIC MACHINE

Alexander P. Wood, Schenectady, N. Y., assignor to General Electric Company, a corporation of New York Application April 12, 1935, Serial No. 16,026

4 Claims. (Cl. 171—252)

My invention relates to dynamo-electric machines, and more particularly to an improved fabricated stator construction thereof.

It is an object of my invention to provide a stator construction for dynamo-electric machines, which requires a minimum number of parts, which is economical to manufacture and assemble and, which will be of simple and rugged construction.

It is a further object of my invention to provide a dynamo-electric machine having a fabricated stator construction including an improved arrangement for securing the end shields thereto.

Further objects and advantages of my invention will become apparent as the following description proceeds, and the features of novelty which characterize my invention will be pointed out with particularity in the claims annexed to and forming a part of this specification.

Figure 1:
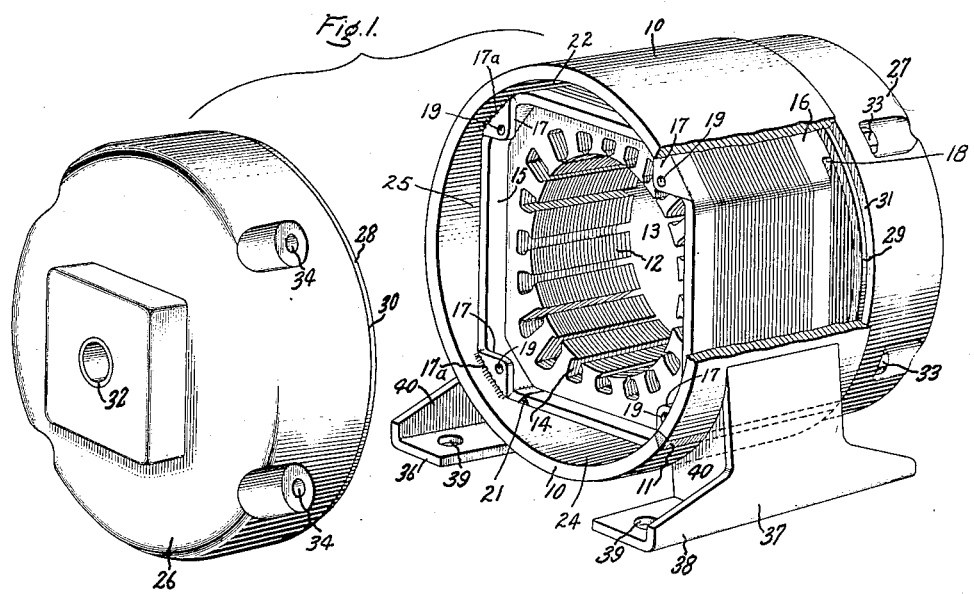
Figure 2:
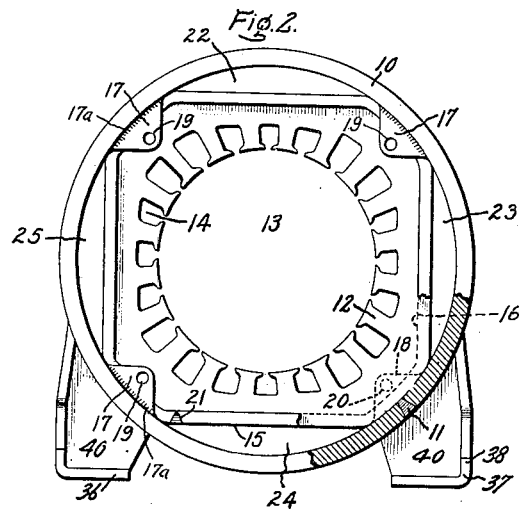
Figure 3:
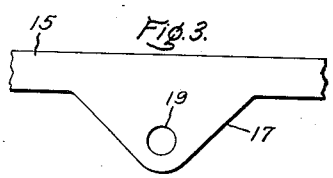

For a better understanding of my invention, reference may be had to the accompanying drawing in which Fig. 1 is an exploded view of a stator for a dynamo-electric machine embodying my invention, a part of the stator frame being shown as broken away; Fig. 2 is an end elevation, partly in section, of the stator shown in Fig. 1 with the end shields removed; and Fig. 3 is a developed fragmentary view of a retaining ring included in the stator shown in Figs. 1 and 2.

Referring to the drawing, in Fig. 1 I have shown a stator for a dynamo-electric mechine embodying my invention which is provided with a cylindrical frame 10. The frame 10 is preferably made from a rectangular strip of steel, or the like, which is bent into the shape of a cylinder, a longitudinal butt joint being formed between the spaced ends of the strip as indicated at 11. In accordance with one aspect of my invention, however, this joint is formed after a core and retaining rings therefor have been mounted within the frame as hereinafter described.

A laminated magnetic core 12 is mounted in the frame 10, the core 12 being made of a stack of relatively thin laminations of magnetic steel, or the like. The exterior of the core 12 is square in shape, the corners being rounded to conform to the inner curvature of the frame 10. A cylindrical longitudinal opening 13 is formed in the center of the core 12 to receive the rotor of the dynamo-electric machine. The core is provided with a series of longitudinal slots 14 in which any suitable windings may be arranged.

Retaining rings 15 and 16 are secured at opposite ends of the core 12 in abutting relationship therewith. The retaining rings are punched, or otherwise formed, from a strip of steel or the like, integral triangular spaced apart ears being formed thereon. In the illustrative form of my invention, four ears 17 are provided on the retaining ring 15. A similar set of four ears 18 are provided on the retaining ring 16. Tapped holes 19 are provided in each of the ears 17 and similar tapped holes 20 are provided in the ears 18. The ears 17 and 18 are bent inwardly at an angle of 90° with respect to the adjacent portions of the surfaces of the retaining rings 15 and 16 respectively. The retaining rings 15 and 16 are bent in the form of a square with rounded corners which closely fit the inner curvature of the frame 10. The rounded corners of the retaining rings 15 and 16 are of the same length as the rounded corners of the core 12, as shown in Fig. 1. The ends of the strip of metal forming the retaining ring 15 are welded, or otherwise rigidly secured, together as indicated at 21. The ends of the strip forming the retaining ring 16 are similarly secured together.

The core 12 is rigidly secured within the frame 10 by a deposit of fused metal which is also used to form the butt joint between the edges of the strip forming the frame 10. This deposit of fused metal also assists in securing the retaining rings 15 and 16 in position. In assembling the parts of the stator, the core 12 and retaining rings 15 and 16 are positioned within the cylindrical frame 10 with one of the rounded corners thereof extending across the space between the adjacent edges of the strip forming the cylindrical frame 10. A deposit of fused metal 11 is then placed in the space between the edges of the strip forming the frame 10 as, for example, by arc welding. The inner surface of the fused metal 11 is exposed to the interior of the frame 10 and joins the adjacent portions of the retaining rings 15 and 16 and the core 12. The core 12 is thus welded to the frame 10 throughout its length and is rigidly secured in position within the frame 10 without the necessity of providing keys or the like. The retaining ring 15 is also secured in position within the frame 10 by a series of line welds 17a formed between the bases of the ears 17 and the adjacent portion of the frame 10. The retaining ring 16 is similarly secured in position at the opposite end of the core 12.

In the construction thus provided, a relatively large portion of peripheral area of the core 12 and the retaining rings 15 and 16 is in direct contact with the interior surface of the cylindrical frame 10, so that heat produced in the dynamo-electric machine during its operation may be readily transferred through the core 12 and retaining rings 15 and 16 to the frame 10 and dissipated to the surrounding air. Also, this construction provides air spaces 22, 23, 24, and 25 on the four sides of the core 12, so that cooling air may be readily circulated therethrough.

The ends of the frame 10 are closed by end shields 26 and 27, respectively. The end shields are of standard construction and are provided with annular flanges 28 and 29, respectively, on the inwardly extending edges thereof. The flanges 28 and 29 fit within the cylindrical frame 10, the ends of the latter bearing against the shoulders 30 and 31 formed at the bases of the flanges 28 and 29, respectively. Bearings, such as a bearing 32, are provided in the end shields 26 and 27 in order to support the rotor of the dynamo-electric machine within the stator.

The ears 17 and 18 formed on the retaining rings 15 and 16, respectively, are utilized in securing the end shields 26 and 27 in position on the frame 10. The end shields 26 and 27 are secured to the ends of the cylindrical frame 10 by a plurality of bolts, such as the bolts 33, which pass through holes 34 and 35 formed in the end shields 26 and 27, respectively. The inner ends of the bolts are threaded in the tapped holes 19 and 20 formed in the ears 17 and 18, respectively. It will thus be seen that the provision of the integral ears 17 and 18 on the retaining rings 15 and 16 forms a simple and economical arrangement for securing the end shields to the stator frame.

The frame 10, described above, is mounted on a pair of legs 36 and 37. The leg 37 includes a U-shaped piece of sheet metal 38 having a hole 39 formed in the base portion thereof through which suitable securing means may be inserted. The leg 37 also includes a pair of vertical pieces of sheet metal 40 which are welded, or otherwise rigidly secured, to the U-shaped piece 38. The upper inner edge of the vertical pieces 40 are rounded in order to fit the adjacent portion of the frame 10 and are welded, or otherwise rigidly secured, thereto. The upper edge of the U-shaped piece 38 is also welded, or otherwise rigidly secured, to the frame 10. The leg 36 is fabricated from sheet metal similarly to the leg 37 and is also welded, or otherwise rigidly secured, to the frame 10.

The frame 10, retaining rings 15 and 16, and core 12 may all be formed from sheet material by relatively simple operations, as described above. When formed in the manner described, a minimum number of manufacturing operations is required and the single fused metal joint 11 serves to secure the core 12 in position as well as assisting in holding the retaining rings 15 and 16 in position.

While I have shown a particular embodiment of my invention in connection with a dynamo-electric machine, I do not desire my invention to be limited to the particular construction shown and described and I intend, in the appended claims, to cover all modifications within the spirit and scope of my invention.

What I claim as new and desire to secure by Letters Patent of the United States, is:—

1. A dynamo-electric machine comprising a cylindrical frame, a laminated core mounted in said frame, a retaining ring mounted in said frame at each end of said core in abutting relation thereto, an end shield for said frame, and means including a plurality of integral inturned ears formed on said retaining ring adjacent said end shield securing said end shield to said frame.

2. A dynamo-electric machine comprising a frame, said frame including a cylindrical sheet of metal having the longitudinal edges thereof arranged in spaced relation, a laminated core mounted in said frame, and means including a joint of fused metal securing together said longitudinal edges of said sheet and securing said core in position in said frame.

3. A dynamo-electric machine comprising a frame, said frame including a cylindrical sheet of metal having the longitudinal edges thereof arranged in spaced relation, a laminated core mounted in said frame, a retaining ring mounted in said frame at each end of said core in abutting relation thereto, and means including a joint of fused metal securing together said longitudinal edges of said sheet and securing said core and said retaining rings in position in said frame.

4. A dynamo-electric machine comprising a cylindrical frame, a laminated core connected in said frame, a pair of square retaining rings having rounded corners conforming to the inner curvature of said frame, said retaining rings being mounted in said frame at each end of said core in abutting relation thereto, an end shield for said frame, and means including a plurality of integral inturned ears formed on said rounded corners of the retaining ring adjacent said end shield securing said end shield to said frame.

ALEXANDER P. WOOD.